United States Patent
Andersen et al.

(10) Patent No.: US 9,747,500 B2
(45) Date of Patent: Aug. 29, 2017

(54) WEARABLE RETINA/IRIS SCAN AUTHENTICATION SYSTEM

(71) Applicant: RAYTHEON COMPANY, Waltham, MA (US)

(72) Inventors: Michael L. Andersen, Indianapolis, IN (US); Thomas J. Stephens, Carmel, IN (US); Todd Lovell, Carmel, IN (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 15/005,805

(22) Filed: Jan. 25, 2016

(65) Prior Publication Data

US 2017/0011263 A1     Jan. 12, 2017

Related U.S. Application Data

(60) Provisional application No. 62/110,408, filed on Jan. 30, 2015.

(51) Int. Cl.
*G06K 9/00* (2006.01)
*G06F 21/32* (2013.01)
(Continued)

(52) U.S. Cl.
CPC ....... *G06K 9/00617* (2013.01); *G02B 27/017* (2013.01); *G06F 21/32* (2013.01);
(Continued)

(58) Field of Classification Search
CPC ...... G02B 2027/0138; G02B 2027/014; G02B 2027/0178; G02B 27/017; G06F 21/32;
(Continued)

(56) References Cited

U.S. PATENT DOCUMENTS

2006/0115130 A1\* 6/2006 Kozlay ............. G02B 27/0093
382/117
2007/0052672 A1\* 3/2007 Ritter .................. G06F 3/03547
345/156
(Continued)

FOREIGN PATENT DOCUMENTS

WO     WO 2009/134784 A2     11/2009

OTHER PUBLICATIONS

Written Opinion of the International Searching Authority for International Application No. PCT/US2016/014755, filed Jan. 25, 2016, Written Opinion of the International Searching Authority mailed Apr. 12, 2016 (9 pgs.).

(Continued)

*Primary Examiner* — Phuoc Tran
(74) *Attorney, Agent, or Firm* — Lewis Roca Rothgerber Christie LLP

(57) ABSTRACT

A wearable retina/iris authentication system includes: a frame; a retina/iris scanner mounted to the frame for capturing images of a retina and/or an iris of a user; a mobile computing device, the mobile computing device including a memory for storing information about the user; a position determining device coupled to the mobile computing device for continuously determining a location of the user and providing the location to the mobile computing device; a display mounted to the frame and coupled to the mobile computing device for displaying information received from the mobile computing device; a database for storing information about one or more of a plurality of retina images and a plurality of iris images for matching with the captured images of one or more of the retina and the iris of the user; and a communication interface for comminuting with external systems remote to the wearable system.

19 Claims, 3 Drawing Sheets

(51) Int. Cl.
*H04W 12/06* (2009.01)
*G02B 27/01* (2006.01)
*H04L 29/06* (2006.01)

(52) U.S. Cl.
CPC ........ *G06K 9/00604* (2013.01); *H04W 12/06* (2013.01); *G02B 2027/014* (2013.01); *G02B 2027/0138* (2013.01); *G02B 2027/0178* (2013.01); *H04L 63/0861* (2013.01)

(58) Field of Classification Search
CPC ............ G06K 9/00604; G06K 9/00617; H04L 63/0861
See application file for complete search history.

(56) References Cited

U.S. PATENT DOCUMENTS

| | | | |
|---|---|---|---|
| 2011/0102137 A1 | 5/2011 | Schröter | |
| 2014/0152792 A1* | 6/2014 | Krueger | ................. G01C 23/00 348/78 |
| 2014/0341441 A1 | 11/2014 | Slaby et al. | |
| 2014/0351896 A1 | 11/2014 | Koo | |
| 2015/0019873 A1 | 1/2015 | Hagemann | |
| 2015/0088546 A1* | 3/2015 | Balram | ................. G06F 19/322 705/3 |

OTHER PUBLICATIONS

International Search Report for International Application No. PCT/US2016/014755, filed Jan. 25, 2016, International Search Report dated Apr. 1, 2016 and mailed Apr. 12, 2016 (6 pgs.).

\* cited by examiner

WEARABLE RETINA/IRIS SCAN AUTHENTICATION SYSTEM

CROSS-REFERENCE TO RELATED APPLICATIONS

This Patent Application claims the benefits of U.S. Provisional Patent Application Ser. No. 62/110,408, filed on Jan. 30, 2015 and entitled "Wearable Retina And Iris Scan For Authentication," the entire contents of which are hereby expressly incorporated by reference.

FIELD OF THE INVENTION

The disclosed invention relates generally to authentication systems; and more particularly to a wearable retina/iris authentication system with a display.

BACKGROUND

Iris scan recognition is an automated method of biometric identification that uses mathematical pattern-recognition techniques on images of the iris of an individual's eye. The complex random patterns of an eye iris are unique, stable, and can be seen from some distance. Iris recognition uses (video) camera technology with subtle near infrared illumination to obtain images of the visible details of the iris. Typically, digital templates encoded from these patterns by mathematical and statistical algorithms allow the identification of an individual. A key advantage of iris recognition, besides its speed of matching and its extreme resistance to false matches, is the stability of the iris as an internal and protected, yet externally visible organ of the eye.

A retinal scan recognition is a biometric technique that uses the unique patterns on a person's retina blood vessels for identification or authentication of that person. A retinal scan is performed by casting an unperceived beam of low-energy infrared light into a person's eye as the person looks through a retina scanner eyepiece. This beam of light traces a standardized path on the retina. The amount of reflection of this beam of light varies during the scan since retinal blood vessels absorb light more readily than the surrounding tissue. The pattern of variations of the reflected light is digitized and stored in a database.

In both iris and retina recognitions, databases of enrolled templates/patterns are searched to match the acquired iris or retina information with the stored information. However, iris/retina scanning is limited to portal or bulky systems, typically mounted on a wall or heavy equipment. Portal as used here means an area such as a building, a room, a city block or a camp area, or a vehicle, such as a car, a bus, a truck, an aircraft or a ship, or similar structures. Moreover, typical authentication methods, including iris/retina scanning, are point-in-time events. That is, once the authentication occurs, there is no further verification or authentication. For example, when access to a restricted area is obtained by door lock equipped with iris/retina scanning, the person enters the restricted area without any further authentication/scanning.

Furthermore, in a typical meeting or government debriefing attended by several people, each with different access or classification levels to confidential information, the information displayed to the attendees is uniform and does not distinguish the individuals' different access or classification levels.

A head-mounted display (HMD) is a device used in some modern applications, for example by pilots of combat aircraft, simulation or training of various military and commercial personnel or virtual reality gaming. HMDs project information on a user's visor or reticle to allow the user to obtain situation awareness and/or cue weapons systems to the direction his head is pointing. More modern HMDs include micro-displays along with a LED illuminator to generate the displayed image, including video images.

However, all the existing iris and retina authentications are point-in-time events. That is, once the authentication occurs, there is no other recurrence or verification of that authentication. Historically, iris/retinal scanning is limited to portal or bulky systems. Moreover, iris/retinal scanning has been limited to bulky systems that are usually wall mounted to provide access to restricted areas.

SUMMARY

In some embodiments, the disclosed invention is a wearable retina/iris authentication system. The system includes: a frame mountable on a head of a user; a retina/iris scanner mounted to the frame for capturing images of one or more of a retina and an iris of the user; a mobile computing device wearable by the user and electrically coupled to the retina/iris scanner, the mobile computing device including a memory for storing information about the user; a position determining device coupled to the mobile computing device for continuously determining a location of the user and providing the location to the mobile computing device; a display mounted to the frame and coupled to the mobile computing device for displaying information received from the mobile computing device; a database for storing information about one or more of a plurality of retina images and a plurality of iris images for matching with the captured images of one or more of the retina and the iris of the user; and a communication interface for comminuting with external systems remote to the wearable system. The mobile computing device continuously authenticates the user to access certain information or certain portal based on the captured images of one or more of the retina and the iris of the user and the stored information in the database at an authentication frequency, and the authentication frequency is dependent on the stored information about the user, the location of the user, a sensitivity of the certain information or a type of the certain portal.

In some embodiments, the disclosed invention is a wearable retina/iris authentication system. The system includes: a helmet wearable on a head of a user; a retina/iris scanner mounted to the helmet for capturing images of one or more of a retina and an iris of the user; a mobile computing device wearable by the user and electrically coupled to the retina/iris scanner, the mobile computing device including a memory for storing information about the user; a display mounted to the helmet and coupled to the mobile computing device for displaying information received from the mobile computing device; a database for storing information about one or more of a plurality of retina images and a plurality of iris images for matching with the captured images of one or more of the retina and the iris of the user; and a wireless communication interface for comminuting with external systems remote to the wearable system. The mobile computing device continuously authenticates the user to access certain information or certain portal based on the captured images of one or more of the retina and the iris of the user and the stored information in the database at an authentication frequency, the authentication frequency is dependent on the stored information about the user and a sensitivity of the certain information or a type of the certain portal, and upon a positive authentication of the user, the wireless communication interface communicates with an external system to grant the user access to said certain information or said certain portal.

BRIEF DESCRIPTION OF THE DRAWINGS

These and other features, aspects, and advantages of the disclosed invention will become better understood with regard to the following description, appended claims, and accompanying drawings.

DETAILED DESCRIPTION

In some embodiments, the disclosed invention adds retina and/or iris authentication to ahead-mounted display (HMD). HMDs are increasingly important in a variety of different applications, for example, soldier systems, some medical procedures, navigation systems, simulation of a variety of complex systems or situations, handing of highly hazardous material, and the like, from training to active operations. The retina/iris scanning on the HMD identifies and authenticates the user and adds control over what is being seen on the HMD. Also, since the HMD is tied to the rest of the wearers system, it can act as a control to other (external) systems that interact with the wearer's system. For example, if the person identified/authenticated doesn't have the right access or privilege, the corresponding external systems will not start up or provide access therein. This way, the disclosed invention ensures identification and/or authentication for as long as the user is wearing the HMD.

In some embodiments, the disclosed invention controls portal access to a location, for example, a room or building of individuals with different clearance levels or information access privileges. Based on the privileges of each of the authenticated persons, the HMD shows information cleared for a particular authenticated person, while still allowing other attendees in the location to participate concurrently in a briefing or meeting, based on their individual privileges or clearance levels. Through a wired or wireless connection to the wearer's system, access to other equipment, such as vehicles, aircrafts, special machinery or weaponry, can be granted through the HMD as well.

Figure 1A:
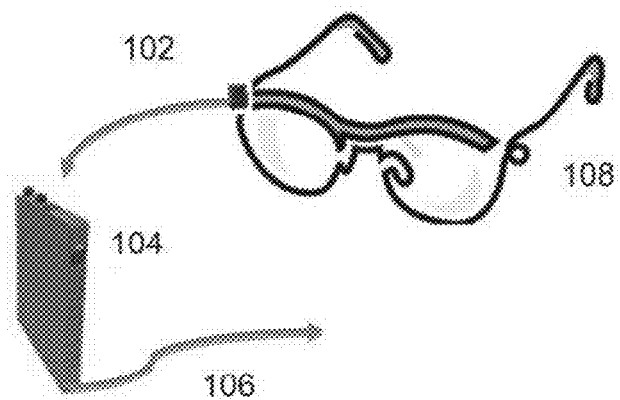
FIG. 1A depicts a wearable retina and/or iris identification/authentication device, according to some embodiments of the disclosed invention.

FIG. 1A depicts a wearable retina and/or iris identification/authentication system 100, according to some embodiments of the disclosed invention. As shown, a wearable frame 108, such as an eye glasses, a helmet or a goggle frame, includes a camera or scanner mounted thereon to scan or take an image of the retina and/or iris of the user wearing the frame 108, and optionally a pico-projector 102 mounted at its front to scan an image received from a mobile computing device 104 that the user is carrying into the (eyes) of the use so that the image may be displayed onto the retina.

In some embodiments, the images are displayed on a reflective glass of the glasses frame to act as a display device. At the same time, the camera/scanner is capable of scanning the retina and/or iris of the wearer to capture its image and transmit the capture image to the mobile computer 104, via a wired or wireless connection. Mobile computing device 104 includes a wired and/or wireless interface 106 for communicating with external systems. The mobile computing device 104 may be a smart phone, a customized mobile computer, a personal digital assistant (PDA), a handheld PC, and the like.

In some embodiments, a position determining device, such as a global positioning system (GPS) may be included in the mobile computing device 104 or in the glasses frame 108 for obtaining and transmitting location information of the user. The location information and the authenticated user information may then be used to provide different access levels to information or equipment. For example, if the user is in or in the vicinity of a highly restricted area, his/her access to certain information and certain physical areas may be limited to a certain degree. As another example, a repair facility may have open areas with equipment that is viewable to numerous individuals. The wearable display can provide details of the viewable equipment (for example previous use environments). The authenticated individual can then see this information on his/her display while unauthenticated individuals would not. The information would be determined by the authentication and comparison to a database providing user and location permissions.

In some embodiments, wearable retina and/or iris identification/authentication system 100 includes a pico-projector (shown as a part of camera 102) that emits low intensity light into the retinal of the wearer and thus displays images directly into the eyes of the wearer. This way, the need for an actual display device (e.g., the glass) is eliminated. In some embodiments, the pico-projector (display), which emits low intensity light into the eye is combined with the eye scanner which scans the eye in a single device/component.

The wearable retina and/or iris identification/authentication system 100 may also include image processing software and iris and/or retina authentication and identification software that processes the captured images of the iris/retina, processes the images and optionally, based on the processed images identifies and authenticates the user. In some embodiments, the more computationally intensive processing of the iris or retina images may be performed by a more appropriate external computing system. The images are then matched to a database of images to identify the user. Once the user is identified, additional authentication or verification processes may be performed to further authenticate the user. For example, another authentication based on the voice of the user may be performed depending on other factors described below. The rights and privileges of the identified user may then be accessed from a database to determine the "access rights/privileges" of the user.

Figure 1B:
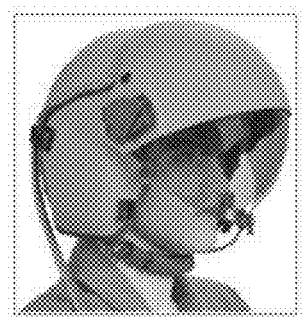
FIG. 1B shows a wearable retina and/or iris identification/authentication device mounted on a helmet, according to some embodiments of the disclosed invention.

FIG. 1B shows a wearable retina and/or iris identification/authentication device mounted on a helmet, according to some embodiments of the disclosed invention. As shown, a scanner/camera is mounted on the right side of the helmet. In this case, the scanner/camera is hardwired to a mobile computing device (not shown), however, this connection may be wireless. The mobile computing device includes a wired and/or wireless interface to external devices, as explained above. The helmet also includes a visor that may be used to display information from the scanner/camera. The helmet also optionally includes a microphone that the user can speak thereon. In some embodiments, the voce of the user (though the microphone) may only be transmitted (e.g., broadcast) to certain group of people or certain locations, depending on the authentication of the user and his privileges.

Figure 2:
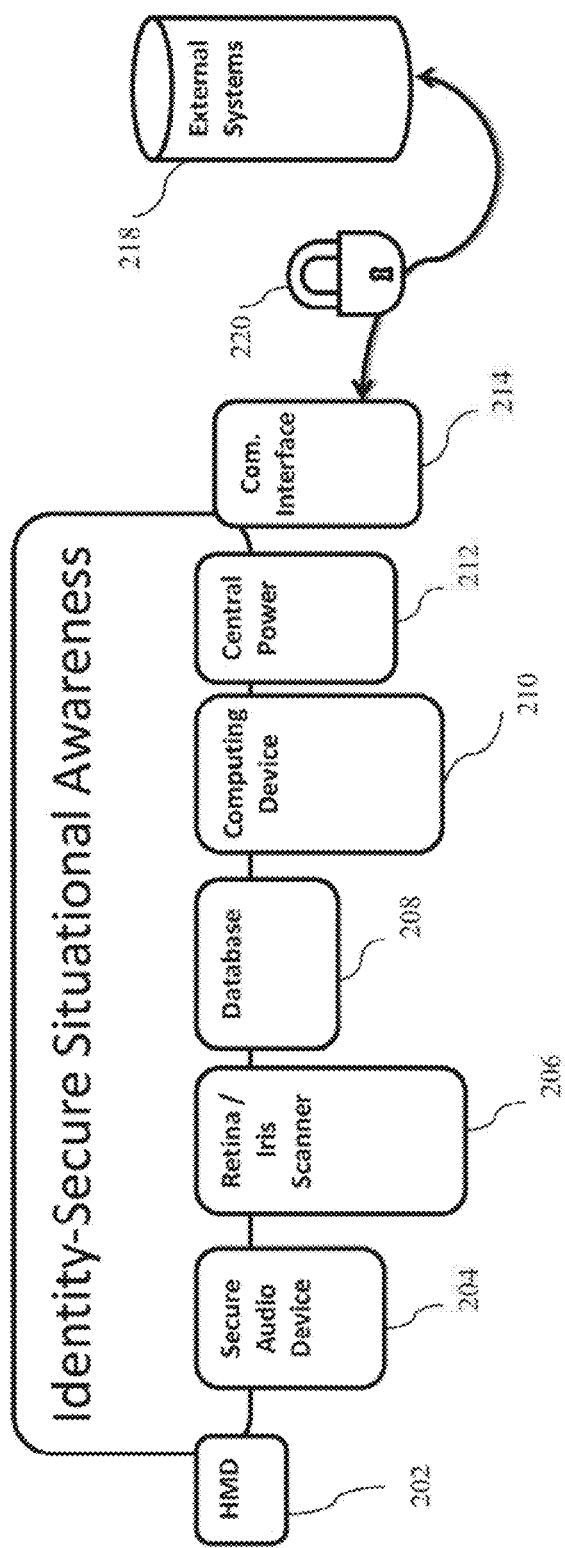
FIG. 2 is a simplified block diagram of a wearable retina and/or iris identification/authentication system and its external interface, according to some embodiments of the disclosed invention.

FIG. 2 shows a simplified block diagram of a wearable retina and/or iris identification/authentication system and its external interface, according to some embodiments of the disclosed invention. As shown, the system includes a Helmet Mounted Display (HMD) 202, such as a flip down optical element, for displaying information; a secure audio device 204, such as simple head phones and microphone, for secure audio content; and a retina/iris scanner 206 for authentication of the user based on a retina and/or iris scan. The display may be a flip down optical element, a liquid crystal display (LCD), a goggle or a pico-display. In some embodiments, the retina/iris scanner may be a camera focused to the retina and/or iris of the user. In some embodiments, the secure audio device may be used to further authenticate the user based on her voice resulting in a more extensive authentication level depending on different applications.

The wearable retina and/or iris identification/authentication system further includes a database 208 for storing security levels, and iris/retina profiles. The database records for each individual describes the authority level of the authenticated individual, and may also include the identity of the individual, his/her preferences and interests, patterns of behavior, health related information, physical attributes and other relevant information about the individuals. The database 208 may be stored locally on a computing device 210, or remotely on a server, which is wirelessly accessible by the computing device 210.

The computing device 210 drives a communication interface 214 to interface to internal modules of the system and external systems 218, such as other computers, workstations, portals, vehicles, databases and the Internet. The communication interface 214 may be a wired, wireless interface or a combination thereof. For example, the communication interface 214 may be wired interface for all or some of the internal components of the system and wireless interface to communicate with external systems. A central power device 212 may include a battery for providing power to the system. Central power device 212 may also include an interface for being charged by an external power charging device and/or charging an external device. The communications between the wearable retina and/or iris identification/authentication system and the external systems 218 may be secured, for example, encrypted by an encryption module 220, which may be implemented in hardware, software or a combination thereof.

In some embodiments, the wearable identification/authentication system of the disclosed invention performs continuous identification/authentication depending on the application, the user and/or the location of the user. The frequency of the continuous authentication for a given application may also change based on similar factors. For instance, in the case of a pilot using the disclosed invention, once the aircraft is in operation, authentication may end or performed much less frequently, but for a workstation containing sensitive information, authentication may be more frequent, for example, every couple of minutes or every few seconds.

Figure 3:
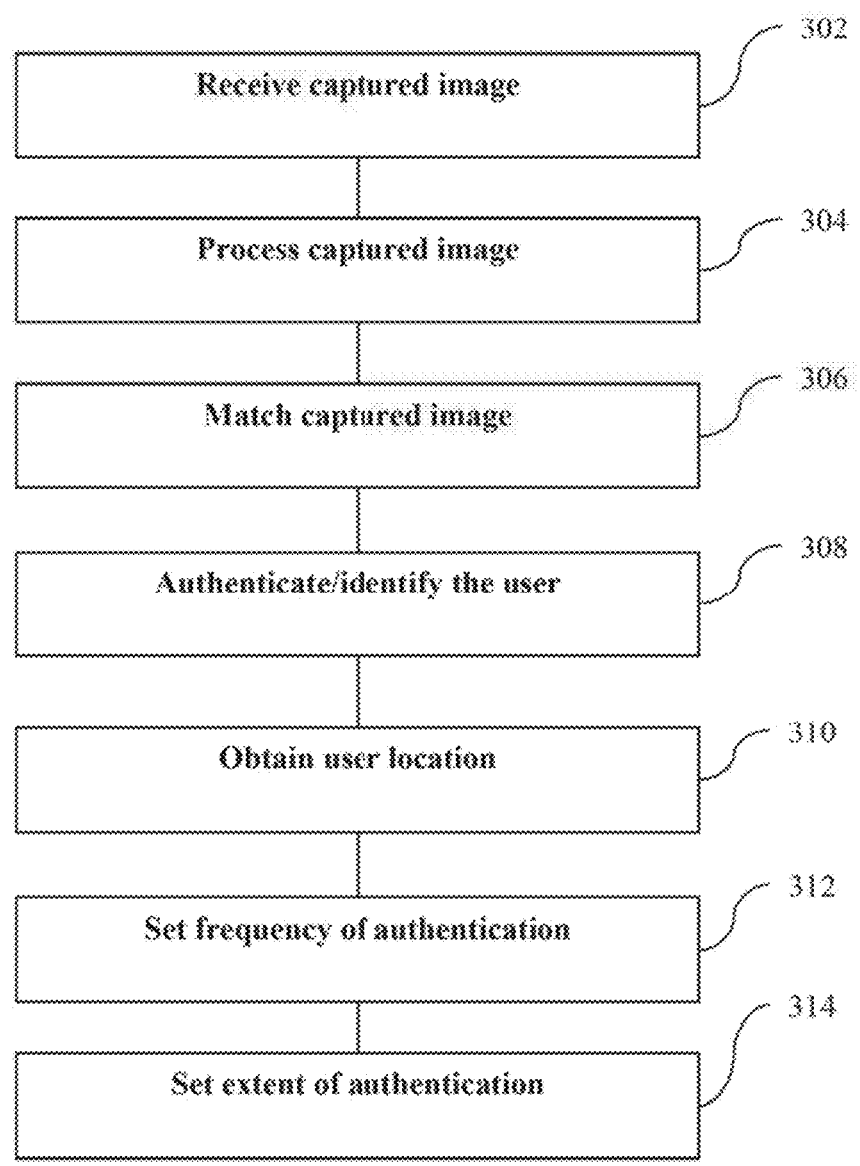
FIG. 3 is a simplified process flow executed on a mobile computing device of a wearable retina and/or iris identification/authentication system, according to some embodiments of the disclosed invention.

FIG. 3 is a simplified process flow executed on a mobile computing device of a wearable retina and/or iris identification/authentication system, according to some embodiments of the disclosed invention. As shown in block 302, one or more images of a retina and/or iris of the user, captured by a scanner, is received by the mobile computing device of the disclosed invention. The mobile computing device then processes the captured image(s), in block 304. For example, the mobile computing device may translate captured images of the iris/retina to the image profiles stored in a database to be matched with the captured images to correct for positioning of the scanner with respect to the users eye and for potential deviations in the position of the scanner. The mobile computing device may also create a data structure or a template of the captured image with unique features of the retina and/or iris to matching with the stored data structures (e.g., profiles and templates) in the database. The mobile computing device may further perform some conventional image processing, such as image smoothing, feature extractions, image tiling, and the like.

In block 306, the (processed) captured image is matched with one or more of the stored image profiles. One skilled in the art would recognize that a 100% matching of the captured image to the stored image profiles may not be feasible and thus the captured image is matched to a certain degree to one or more of the stored images, in some embodiments. In some embodiments, a list of potential candidates may be generated as the result of the matching process. In block 308, the system then determines the best candidate and authenticates/identifies the user to access certain information r access to certain portal, based on the match degree and/or the information about the user, such as her historical behavior patterns, his location and the degree of accuracy required by the application for that user. In block 310, the mobile computing device obtains location information of the user, for example, from a GPS device.

If the authentication is a continuous authentication at a certain frequency, in block 312, the mobile computing device causes the scanner to set its rate of image capturing, and sets the authentication frequency, depending on the stored information about the user, the location of the user, the sensitivity (e.g., confidentiality level) of the certain information or the type of the certain portal. Optionally, the mobile computing device may also extend the scope of the authentication, in block 314. For example, other forms of authentication such as voice authentication may be performed based on the mobile computing device.

Additionally, the system of the disclosed invention may monitor the activity of the user and if it is determined that the user has not been active for a predetermined period of time (e.g., set as a system parameter, depending on the user and/or the application), the another authentication of the user is automatically performed. For example, if a user wearing the wearable identification/authentication system of the disclosed invention has not used a computer, database or an equipment for a predetermined period of time, the iris/retina verification is automatically performed on the user to re-authenticate the user.

The frequency of the user authenticated may set by a system administrator or automatically set by the system, depending on different factors. The factors that determined the extend and frequency of authentication include one or more of the application (for example, what area or information the user is attempting to access or is accessing), the sensitivity/confidentiality level of the information or the area, the location of the user (e.g., determined by a GPS), the surrounding or environment of where the user is (for example, whether the user is surrounded by several other people in a conference room, whether the user is inside or outside of an enclosure such as a building or vehicle, whether and to what extent the building or the vehicle is physically secure, the size of the building and the like), behavior pattern of the user (such as number of and/or the time between prior accesses to an equipment of information), the identity and access privileges or authority levels of the user, or even the fatigue level of the user. All or some of these factors may automatically be determined by the system as described below.

For example, the sensitivity of the information or the area that the user is attempting to access or is already accessing may be determined from information from a (remote or local) database or the bit contents of data packets. The location of the user may be determined by a location determining system, such as a GPS and information about the surrounding or environment of the determined area may be obtained from various geospatial or map databases. Similarly, the identity, access privileges and behavior pattern of the user may be obtained from a user profile file stored remotely or locally. Information about the type and physical security arrangement for a building, vehicle or equipment may also be stored in a (remote or local) database and access by the system to determine the related factors for frequency and extent of the authentication.

For instance, when the user is within a highly restricted area, such as sensitive military, security or government buildings or vehicles, continuous authentication is performed more frequently and more extensively. For example, continuous authentication may be performed every 10 seconds and performed both on the iris and on the retina (and optionally on the voice) of the user, in such circumstances. Similarly, continuous authentication is performed more frequently where the user is located in a room or area with several other people (that may potentially use the user's system without authorization) that a remote area such as a desert where no other person is present. Likewise, the frequency of continuous authentication may be higher for smaller vehicle than the larger vehicle since there a higher likelihood that the user spend less time in a small vehicle than a larger vehicle, such as a ship or a tank. Conversely, the frequency of continuous authentication may be higher for larger areas/buildings than the smaller areas/buildings or location since there a lower likelihood that the user have access to unauthorized information or location in a smaller area (e.g., a conference or equipment room) that a larger area, such as Pentagon building.

The behavior pattern of the user, for example, how often and for how long the user tends to wear the system, how many time has a particular user have (or tried to unsuccessfully) accessed the information, the building or the vehicle may be used to determine the frequency and extent of continuous authentication. For example, if the user has been in a restricted building every morning for the last month, then the frequency and extent of continuous authentication is lower than if it is the user's first time trying to obtain access. Moreover, if the user has unsuccessfully tried several times to obtain access, then the frequency and extent of continuous authentication would be higher. Similarly, if the number of false authentications exceeds a predetermined number before authentication is granted, then the frequency of the continuous authentication is increased, for example, for at least a period of time after the grant. Also, if false authentications are greater than a certain level (e.g., 10% of image readings), then the authentication is denied and the user has to wait for a certain cooling off period. Likewise, if the number of false authentications in a row is greater than a certain number, the system may shut down for a certain cooling off period. For example, the system is shut down for a given amount of time until the user is authenticated for or within a given amount of time.

Mounting the camera to a fixed location with respect to the eye of the user while still being able to authenticate as the eye moves in relation to the camera may be accomplished in several ways, according to embodiments of the disclosed invention. For example, different perspectives of the iris to the camera are recorded in a memory of the system or calculated by the computing device and the path forward is determined in initial testing to determine the number of perspective of the iris/retina that would need to be stored in the database.

In some embodiments, a process, executed by the computing device, re-orients the captured image of the retina/iris to a stored image profile that is to be matched with the captured image. In some embodiments, the system stores multiple (captured) images of the retina/iris so that deviations in the orientation of the camera to the eye can be accounted for. For example, an image of the iris/retina, is taken from all or several possible orientations of the camera to the eye. Therefore, the system authenticates a given user by comparing a series of images of all or several possible perspectives, in the database, and not just a single image.

In some embodiments, the wearable identification/authentication system of the disclosed invention uses the retina and/or iris scanning information to gather biometric data about the user. For example, the biometric data gathered by the scanner may be used to determine the level of fatigue of the user. For example, fatigue of the user can be attributed based on number of blinks per second, dilation of the eye, and/or drifting of the eye. Since the scanner is scanning (taking a video of) the eye, these types of biometric indicators may be recorded as well and used to determine or estimate the fatigue level of the user. This fatigue information can then be used to determine whether the user is capable of a given activity. This could be a physical activity or mental activity since a fatigued user would potentially have reduced comprehension and/or agility. In the case of vehicle operation, detection of a fatigue could activate a warning (e.g., sound, light, vibration and a combination thereof) that the user needs to stop operating the vehicle.

It will be recognized by those skilled in the related fields that various modifications may be made to the illustrated and other embodiments of the invention described above, without departing from the broad inventive step thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A wearable retina/iris authentication system comprising:
    a frame mountable on a head of a user;
    a retina/iris scanner mounted to the frame for capturing images of one or more of a retina and an iris of the user;
    a mobile computing device wearable by the user and electrically coupled to the retina/iris scanner, the mobile computing device including a memory for storing information about the user;
    a position determining device coupled to the mobile computing device for continuously determining a location of the user and providing the location to the mobile computing device;
    a display mounted to the frame and coupled to the mobile computing device for displaying information received from the mobile computing device;
    a database for storing information about one or more of a plurality of retina images and a plurality of iris images for matching with the captured images of one or more of the retina and the iris of the user and information about access privilege levels of a plurality of users; and a communication interface for comminuting with external systems remote to the wearable system, wherein the mobile computing device continuously authenticates the user to access certain information or certain portal based on the captured images of one or more of the retina and the iris of the user and the stored information in the database at an authentication frequency, wherein the authentication frequency is dependent on a sensitivity of the certain information or a type of the certain portal being accessed by the user, and wherein when the user is authenticated by the mobile device, the access privilege level of the user is determined from the database, a remote database remote from the user is accessed based on the user access privilege level, and limited information is retrieved from the remote database based on the user access privilege level and displayed in the display.

2. The wearable retina/iris authentication system of claim 1, wherein the frame is one or more of the group consisting of a helmet, an eye glasses and a goggle.

3. The wearable retina/iris authentication system of claim 1, wherein the display is one or more of the group consisting of a flip down optical element, a liquid crystal display (LCD), a goggle and a pico-display.

4. The wearable retina/iris authentication system of claim 1, wherein the communication interface is one or more of the group consisting of a wired interface and a wireless interface.

5. The wearable retina/iris authentication system of claim 1, wherein the stored information about the user include one or more of a behavior pattern of the user, identity and access privileges of the user, and a fatigue level of the user.

6. The wearable retina/iris authentication system of claim 1, wherein the retina/iris scanner obtains biometric data about the user and the mobile computing device utilizes said biometric data to determine a level of fatigue of the user.

7. The wearable retina/iris authentication system of claim 1, wherein the database is remote from the user and accessible via the communication interface.

8. The wearable retina/iris authentication system of claim 1, wherein the mobile computing device increases a level of the authentication, based on the stored information about the user, the location of the user, the sensitivity of the certain information or the type of the certain portal.

9. The wearable retina/iris authentication system of claim 1, wherein the mobile computing device increases a level of the authentication by performing a voice authentication of the user, based on the stored information about the user, the location of the user, the sensitivity of the certain information or the type of the certain portal.

10. The wearable retina/iris authentication system of claim 1, wherein the certain portal is a vehicle and wherein the mobile computing device increases the authentication frequency for a smaller vehicle and decreases the authentication frequency for a larger vehicle.

11. The wearable retina/iris authentication system of claim 1, wherein the certain portal is an area, and wherein the mobile computing device decreases the authentication frequency for a smaller area and increases the authentication frequency for a larger area.

12. A wearable retina/iris authentication system comprising:

a helmet wearable on a head of a user;

a retina/iris scanner mounted to the helmet for capturing images of one or more of a retina and an iris of the user;

a mobile computing device wearable by the user and electrically coupled to the retina/iris scanner, the mobile computing device including a memory for storing information about the user;

a display mounted to the helmet and coupled to the mobile computing device for displaying information received from the mobile computing device;

a database for storing information about one or more of a plurality of retina images and a plurality of iris images for matching with the captured images of one or more of the retina and the iris of the user; and a wireless communication interface for comminuting with external systems remote to the wearable system, wherein the mobile computing device continuously authenticates the user to be able to operate an equipment based on the captured images of one or more of the retina and the iris of the user and the stored information in the database at an authentication frequency, wherein the authentication frequency is dependent on a type of the equipment being accessed by the user, wherein upon a positive authentication of the user, the wireless communication interface communicates with an external system to grant the user access to said equipment, and wherein when the user starts operating the equipment, the authentication frequency is reduced.

13. The wearable retina/iris authentication system of claim 12, wherein the stored information about the user include one or more of a behavior pattern of the user, identity and access privileges of the user, and a fatigue level of the user.

14. The wearable retina/iris authentication system of claim 12, wherein the retina/iris scanner obtains biometric data about the user and the mobile computing device utilizes said biometric data to determine a level of fatigue of the user.

15. The wearable retina/iris authentication system of claim 12, wherein the mobile computing device determines access privilege for the user based on said authentication of the user, obtains information from external systems via the communication interface and displays said information on the display, according to said determined access privilege for the user.

16. The wearable retina/iris authentication system of claim 1, wherein the database is remote from the user and accessible via the communication interface.

17. The wearable retina/iris authentication system of claim 12, wherein the mobile computing device increases a level of the authentication, based on the stored information about the user, the location of the user, the sensitivity of the certain information or the type of the certain portal.

18. The wearable retina/iris authentication system of claim 12, wherein the mobile computing device increases a level of the authentication by performing a voice authentication of the user, based on the stored information about the user, the location of the user, the sensitivity of the certain information or the type of the certain portal.

19. The wearable retina/iris authentication system of claim 12, wherein the certain portal is a vehicle and wherein the mobile computing device increases the authentication frequency for a smaller vehicle and decreases the authentication frequency for a larger vehicle.

* * * * *